United States Patent [19]

Hasegawa

[11] Patent Number: 5,667,050
[45] Date of Patent: Sep. 16, 1997

[54] ELECTROMAGNETIC COUPLING APPARATUS

[75] Inventor: Tomoya Hasegawa, Gunma, Japan

[73] Assignee: Ogura Clutch Co., Ltd., Japan

[21] Appl. No.: 590,205

[22] Filed: Jan. 23, 1996

[30] Foreign Application Priority Data

Jan. 30, 1995 [JP] Japan ................................. 7-032965
Aug. 24, 1995 [JP] Japan ................................. 7-239174

[51] Int. Cl.$^6$ .................................................. F16D 27/112
[52] U.S. Cl. ...................................... 192/84.961; 192/30 V
[58] Field of Search ............................. 192/84 C, 30 V, 192/200, 209, 84.961

[56] References Cited

U.S. PATENT DOCUMENTS

| | | |
|---|---|---|
| 4,808,870 | 2/1989 | Gonda . |
| 5,009,297 | 4/1991 | Gonda . |
| 5,046,594 | 9/1991 | Kakinuma ............................. 192/84 C |
| 5,184,705 | 2/1993 | Sekiguchi et al. ..................... 192/84 C |
| 5,445,256 | 8/1995 | Tabuchi et al. ....................... 192/84 C |

FOREIGN PATENT DOCUMENTS

| | | |
|---|---|---|
| 56-62430 | 5/1981 | Japan . |
| 58-72727 | 4/1983 | Japan . |

*Primary Examiner*—Richard M. Lorence
*Attorney, Agent, or Firm*—Blakely Sokoloff Taylor & Zafman

[57] ABSTRACT

An electromagnetic coupling apparatus includes an armature hub, a leaf spring, an armature, a rubber stopper, a fixing member, a rubber vibration insulator, a rotor, an electromagnetic coil, and a field core. The armature hub is fixed to the rotating shaft of a unit and has a flange portion formed with a through hole. The fixing member is fixed to the armature and has a trunk portion and a head portion formed with an annular wall portion on its outer circumference. The rubber vibration insulator is disposed between a side surface of the flange portion of the armature hub and the head portion of the fixing member, and is constituted by a cylindrical portion and a disk portion. The rotor opposes the armature through a first gap of a predetermined size. A second gap larger than the first gap is formed between a distal end of the wall portion of the fixing member and the flange portion of the armature hub, and a third gap is formed between one side surface of the disk portion of the rubber vibration insulator and the side surface of the flange portion of the armature hub.

15 Claims, 4 Drawing Sheets

ELECTROMAGNETIC COUPLING APPARATUS

BACKGROUND OF THE INVENTION

The present invention relates to an electromagnetic coupling apparatus provided with rubber vibration insulators for preventing attraction noise and screaming noise from being generated when an armature is magnetically attracted to and frictionally engaged by a rotor and, more particularly, to prevention of falling off of the rubber vibration insulators.

Of conventional electromagnetic coupling apparatuses, in an electromagnetic clutch for an automotive air-conditioning system, a stopper plate formed as an extension of the flange portion of an armature hub mounted on the rotating shaft of a compressor is fixed to the flange portion of the armature hub together with the proximal end portions of leaf springs with caulked rivets.

A plurality of rubber stoppers for setting the initial deflection of the leaf springs are mounted on the stopper plate at distances in the circumferential direction, and the armature to which the free end portions of the leaf springs are fixed is abutted against the rubber stoppers by the spring force (restoring force) of the leaf springs. Furthermore, a plurality of recessed portions are formed in the stopper plate at distances in the circumferential direction, and the distal ends of headed members (rivets), having trunk portions extending through through holes formed at the centers of rubber vibration insulators accommodated in the recessed portions and through holes formed at the bottom portions of the recessed portions, are caulked in stepped through holes formed in the armature. The rubber vibration insulators are interposed between the head portions of the headed members integrally formed with the armature and the bottom portions of the recessed portions of the stopper plate. Recessed portions for accommodating the rubber vibration insulators may be formed in the head portions of the headed members (see Japanese Utility Model Laid-Open No. 1-136727).

In the electromagnetic clutch having the above structure, when an electromagnetic coil in a field core supported by the compressor is energized, the armature is magnetically attracted to the rotor rotatably supported by the compressor, so that rotation of the rotor coupled to the pulley of the engine through a belt is transmitted to the rotating shaft of the compressor. When the electromagnetic coil is deenergized, the magnetic flux disappears, so that the armature is separated from the rotor by the spring force of the leaf springs and is moved backward until it is abutted against the rubber stoppers. As a result, transmission of rotation to the rotating shaft of the compressor is disconnected. In the conventional electromagnetic clutch, when this operation is repeated, every time the armature is magnetically attracted to the rotor, the rubber vibration insulators are compressed by the headed members integrally formed with the armature. Thus, the magnetic attraction noise generated between the armature and the rotor and the screaming noise generated by frictional engagement that takes place until the armature and the rotor are rotated integrally are prevented.

The rubber vibration insulators of the conventional electromagnetic clutch are compressed in the recessed portions of the stopper plate as the armature is magnetically attracted to the rotor. Also, deformation of the rubber vibration insulators is suppressed by the inner circumferential walls of the recessed portions of the stopper plate, so that the through holes at the centers of the rubber vibration insulators will not be enlarged by the centrifugal force to let the rubber vibration insulators to fall off from the headed members. In general, however, the space between the stopper plate and the armature is designed to about 2 mm to be equal to the thickness of the rubber stoppers that are provided to obtain the initial deflection of the leaf springs. To form recessed portions having a sufficient depth for accommodating the rubber vibration insulators, for example, the proximal end portions of the leaf springs, a spacer for increasing the space between the stopper plate and the armature, and the stopper plate are overlaid on the flange portion of the armature hub, and are fixed integrally with a rivet which is caulked.

In this structure, a gap must be provided between the armature abutted against the rubber stoppers by the leaf springs and the recessed portions of the stopper plate, and this gap must be set more or less largely in consideration of elastic deformation of the rubber stoppers. Then, the size of the electromagnetic coupling apparatus in the axial direction is increased. In addition, the thickness of the rubber stoppers is also increased, leading to many design modifications of the existing electromagnetic coupling apparatus, which is not economical.

The air gap between the armature and the rotor is generally designed to about 0.3 to 0.6 mm. Every time the armature is magnetically attracted to the rotor, the rubber vibration insulators are compressed and elastically deformed. If the entire inner circumferential surfaces of the cylindrical rubber vibration insulators are fitted on the trunk portions of the headed members, as in the conventional electromagnetic clutch, the outer circumferential surfaces of the elastically deformed rubber vibration insulators are sandwiched between the ridges of the openings of the recessed portions and the head portions of the headed members, or the end faces of the rubber vibration insulators close to their centers bite into the edges of the openings of the through holes formed in the bottom portions of the recessed portions. Then, cracks are formed in the rubber vibration insulators, thereby degrading the durability of the rubber vibration insulators.

SUMMARY OF THE INVENTION

It is an object of the present invention to provide an electromagnetic coupling apparatus in which falling off of the rubber vibration insulators is prevented without increasing the size of the apparatus in the axial direction.

It is another object of the present invention to provide an electromagnetic coupling apparatus in which the durability of the rubber vibration insulators is increased.

In order to achieve the above objects of the present invention, there is provided an electromagnetic coupling apparatus comprising an armature hub fixed to a rotating shaft of a unit, the armature hub having a flange portion formed with a through hole, a leaf spring having a proximal end portion fixed to the flange portion of the armature hub, an armature to which a free end portion of the leaf spring is fixed and which is biased in a decoupling direction, a rubber stopper disposed between the flange portion of the armature hub and the armature, a fixing member fixed to the armature, the fixing member having a trunk portion extending through the through hole formed in the flange portion of the armature hub and a head portion projecting from the flange portion of the armature hub to a side opposite the armature and formed with an annular projecting ridge portion on a peripheral portion thereof, a rubber vibration insulator disposed between a side surface of the flange portion of the armature hub and the head portion of the fixing member, the rubber vibration insulator being constituted by a cylindrical portion which is sandwiched between the side surface of the flange portion of the armature hub and the head portion of the fixing member and which has an outer circumferential surface fitted with the projecting ridge portion of the fixing member, and a disk portion formed in the cylindrical portion to be integral therewith and having a through hole to fit on the trunk portion of the fixing member, a rotor opposing the armature through a first gap of a predetermined size, an electromagnetic coil for generating a magnetic flux in order to cause the rotor to magnetically attract the armature against a biasing force of the leaf spring, and a field core fixed to the unit to accommodate the electromagnetic coil, wherein a second gap larger than the first gap is formed between a distal end of the projecting ridge portion of the fixing member and the flange portion of the armature hub, and a third gap is formed between one side surface of the disk portion of the rubber vibration insulator and the side surface of the flange portion of the armature hub.

DESCRIPTION OF THE PREFERRED EMBODIMENTS

Figure 1:
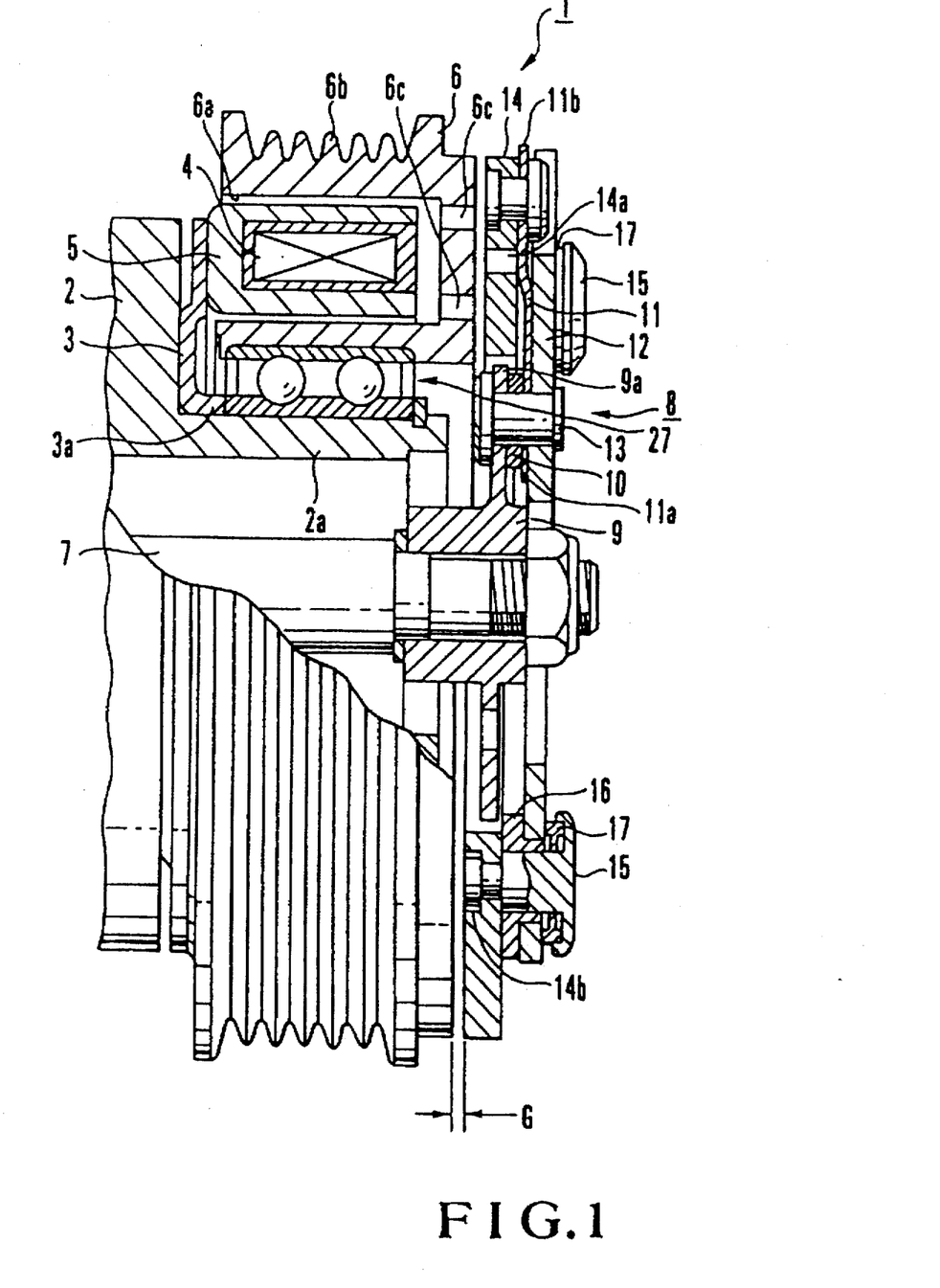
FIG. 1 is a sectional view of an electromagnetic clutch as an electromagnetic coupling apparatus according to the first embodiment of the present invention.
Figure 2:
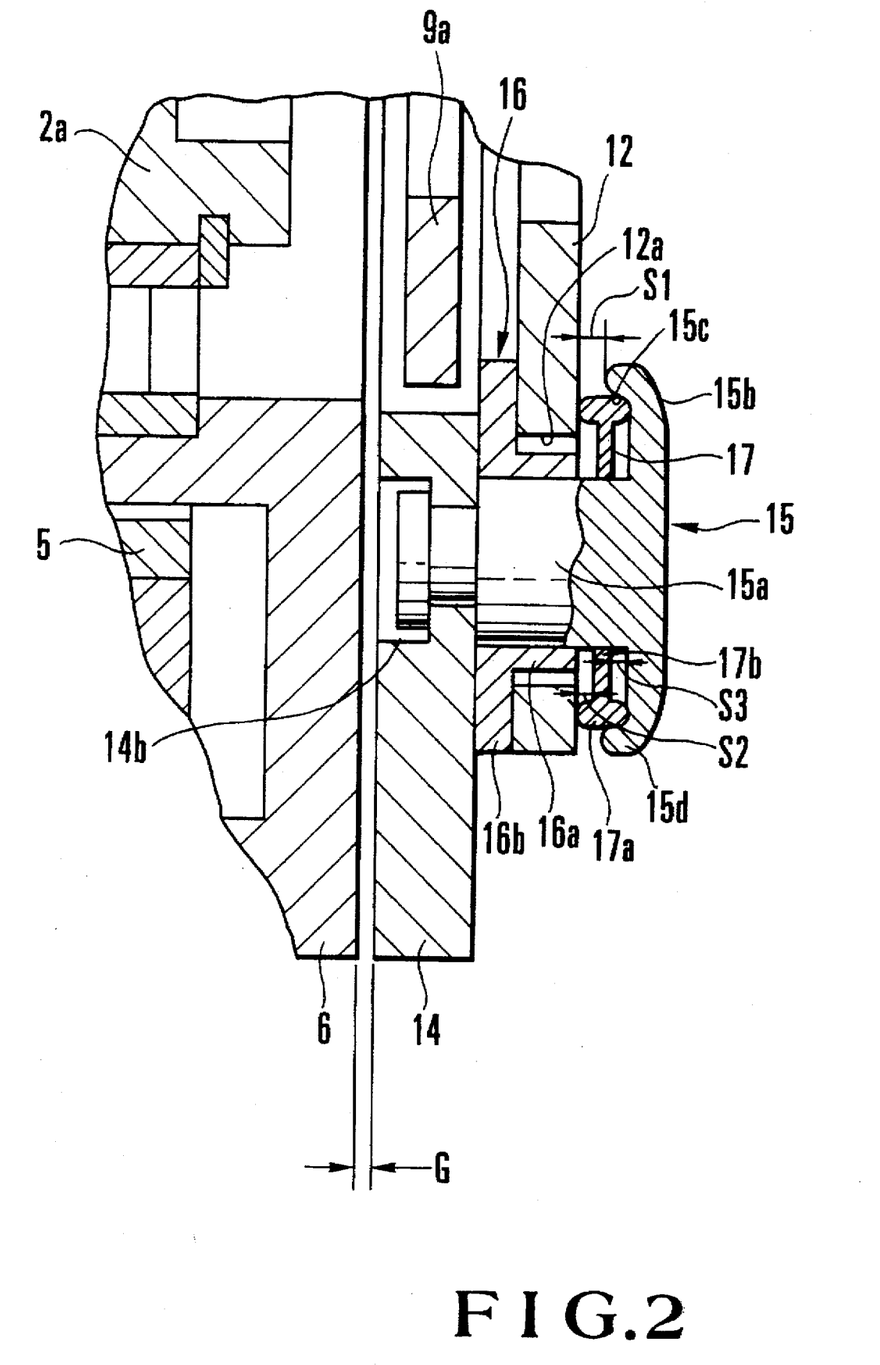
FIG. 2 is an enlarged sectional view of the main part of the electromagnetic clutch shown in FIG. 1.

FIG. 1 shows an electromagnetic clutch as an electromagnetic coupling apparatus according to the first embodiment of the present invention, and FIG. 2 shows the main part of FIG. 1. The electromagnetic clutch shown in FIGS. 1 and 2 will be described.

An electromagnetic clutch 1 is an apparatus for transmitting and disconnecting transmission of rotation of the engine to a compressor 2 of the automotive air conditioning system. In the electromagnetic clutch 1, a cylindrical portion 3a of a mounting plate 3 and a bearing 27 consisting of ball bearings are fitted on the outer circumferential portion of a cylindrical portion 2a of the compressor 2, and are prevented from falling off with a retaining ring. The mounting plate 3 is welded to the rear surface of a field core 5 accommodating an electromagnetic coil 4. Thus, the field core 5 is fixed to the cylindrical portion 2a of the compressor 2 through the mounting plate 3. A rotor 6 formed with an annular groove 6a, belt grooves 6b, and an arcuated slit 6c is rotatably supported by the bearing 27. The field core 5 is inserted in the annular groove 6a. Belts are wound on the belt grooves 6b. The slit 6c is formed to bypass the magnetic flux of the electromagnetic coil 4. An armature assembly 8 is mounted to a rotating shaft 7 of the compressor 2.

In the armature assembly 8, a stopper plate 12 is integrally fixed to a flange portion 9a of an armature hub 9, which is spline-fitted on the distal end of the rotating shaft 7 through a gap adjusting shim, through a spacer 10 and a proximal end portion 11a of a leaf spring 11 with a rivet 13. The stopper plate 12 constitutes a flange unit having a predetermined shape by being fixed, integrally or otherwise, to the flange portion 9a of the armature hub. A free end portion 11b of the leaf spring 11 is fixed to an armature 14 with a rivet. A frictional surface is formed on the armature 14 to oppose the frictional surface of the rotor 6 through a first gap G having a predetermined size. Note that reference numeral 14a denotes an arcuated slit formed in the armature 14 in order to bypass the magnetic flux of the electromagnetic coil 4.

Through holes 12a each shown in FIG. 2 are formed in the stopper plate 12 at three equal angular positions of the stopper plate 12. The distal ends of fixing members 15 are caulked in stepped through holes 14b formed in the armature 14. The fixing members are made of a metal material, and their columnar trunk portions 15a extend through the corresponding through holes 12a. A cylindrical portion 16a of a rubber stopper 16 is fitted on the trunk portion 15a of each fixing member 15, and a disk portion 16b of the rubber stopper 16 is sandwiched between the armature 14 and the stopper plate 12. The disk portion 16b of the rubber stopper 16 limits the backward position of the armature 14 and sets the initial deflecting amount of the leaf spring 11. Rubber vibration insulators 17 are interposed between conical head portions 15b of the fixing members 15 and the stopper plate 12. The end face of the cylindrical portion 16a of the rubber stopper 16 is located on a plane substantially corresponding to the side surface of the stopper plate 12.

The peripheral portion of the head portion 15b of each fixing member 15 forms a spindle-shaped wall portion (projecting ridge portion) 15d bent by plastic molding using a pressing force such that its inner bent portion 15c is arcuated. The distal end of the wall portion 15d is arcuatedly chamfered. A second gap S1 formed between the distal end of the wall portion 15d and the stopper plate 12 is larger than the first gap G formed between the armature 14 and the rotor 6.

Each rubber vibration insulator 17 has a cylindrical portion 17a and a disk portion 17b. The cylindrical portion 17a has two end portions forming arcuated surfaces similar to the arcuated surface of the bent portion 15c of the fixing member 15. The disk portion 17b is provided in the cylindrical portion 17a to extend in the radial direction and formed with a through hole into which the trunk portion 15a of the fixing member 15 is pressed and fitted.

The disk portion 17b of the rubber vibration insulator 17 is assembled such that it is not in contact with the side surface of the stopper plate 12 and the head portion 15b of the fixing member 15. A third gap S2 is formed between one side surface of the disk portion 17b and the side surface of the stopper plate 12, and a fourth gap S3 is formed between the other side surface of the disk portion 17b and the head portion 15b of the fixing member 15. Each of the third and fourth gaps S2 and S3 is equal to or slightly larger than the first gap G. When the armature 14 is magnetically attracted to the rotor 6, due to the presence of the third and fourth gaps S2 and S3, the cylindrical portion 17a of each rubber vibration insulator 17 will not largely project into the space between the distal end of the wall portion 15d of the fixing member 15 and the stopper plate 12 due to elastic deformation, and the disk portion 17b of each rubber vibration insulator 17 will not bite into the corresponding through hole 12a of the stopper plate 12. In the state shown in FIG. 2, the cylindrical portion 17a of the rubber vibration insulator 17 is not compressed.

In the electromagnetic clutch 1 having the above structure, when the electromagnetic coil 4 is energized, the magnetic flux from the rotor 6 flows through the first gap G and is bypassed to the armature 14, thus flowing through a double flux type magnetic circuit. Hence, the armature 14 is magnetically attracted to the rotor 6 against the spring force of the leaf spring 11 and the rubber vibration insulator 17. Rotation of the engine is transmitted from the rotor 6 to the rotating shaft 7 of the compressor 2 through the armature assembly 8. When power supply to the electromagnetic coil 4 is cut off, the magnetic flux disappears. Thus, the armature 14 is separated from the rotor 6 by the leaf spring 11 and is moved backward until it is abutted against the rubber stopper 16. Therefore, transmission of rotation to the rotating shaft 7 of the compressor 2 is disconnected.

During repetition of this operation, attraction noise generated when the armature 14 is magnetically attracted to the rotor 6 and screaming noise generated when the frictional surfaces of the armature 14 and rotor 6 are frictionally engaged with each other are prevented since vibration generated in the armature 14 is absorbed by the rubber vibration insulator 17. The cylindrical portion 17a and disk portion 17b of the rubber vibration insulator 17 which are compressed by the fixing member 15 as the armature 14 is moved will not bite into the opening portion of the through hole 12a of the stopper plate 12, or the outer circumferential surface of the cylindrical portion 17a will not be sandwiched between the distal end portion of the wall portion 15d of the fixing member 15 and the stopper plate 12.

In addition, since the cylindrical portion 17a of the rubber vibration insulator 17 having a low rubber hardness can elastically deform into the fourth gap S3, a compression stress serving as a reaction force that occurs when magnetically attracting the armature 14 to the rotor 6 becomes small, thus providing attracting characteristics of the armature 14 which are similar to those of an electromagnetic clutch which is not provided with rubber vibration insulators 17.

Each rubber vibration insulator 17 which is elastically deformed by the magnetic attracting force of the armature 14 and each rubber stopper 16 which is elastically deformed by the spring force of the leaf spring 11 are fitted on the trunk portion 15a of the fixing member 15 in the non-contact manner. In addition, the cylindrical portion 16a of the rubber stopper 16 does not project from the through hole 12a of the stopper plate 12 toward the disk portion 17b of the rubber vibration insulator 17. Hence, during repetition of the above operation, the rubber vibration insulators 17 and the rubber stoppers 16 are elastically deformed independently of each other.

More specifically, when the armature 14 is magnetically attracted to the rotating rotor 6, the armature 14 and the stopper plate 12 coupled to each other through the leaf springs 11 are shifted in the rotational direction, and the cylindrical portions 16a of the rubber stoppers 16 are abutted against the inner surfaces of the through holes 12a of the stopper plate 12. However, while the compression stress of the rubber vibration insulators 17 is applied, the pressing force of the inner surfaces of the through holes 12a does not act on the cylindrical portions 16a of the rubber stoppers 16. Thus, the rubber stoppers 16 and the rubber vibration insulators 17 have a better durability when compared to a case wherein the rubber stoppers 16 and the rubber vibration insulators 17 are integrally formed.

Figure 3:
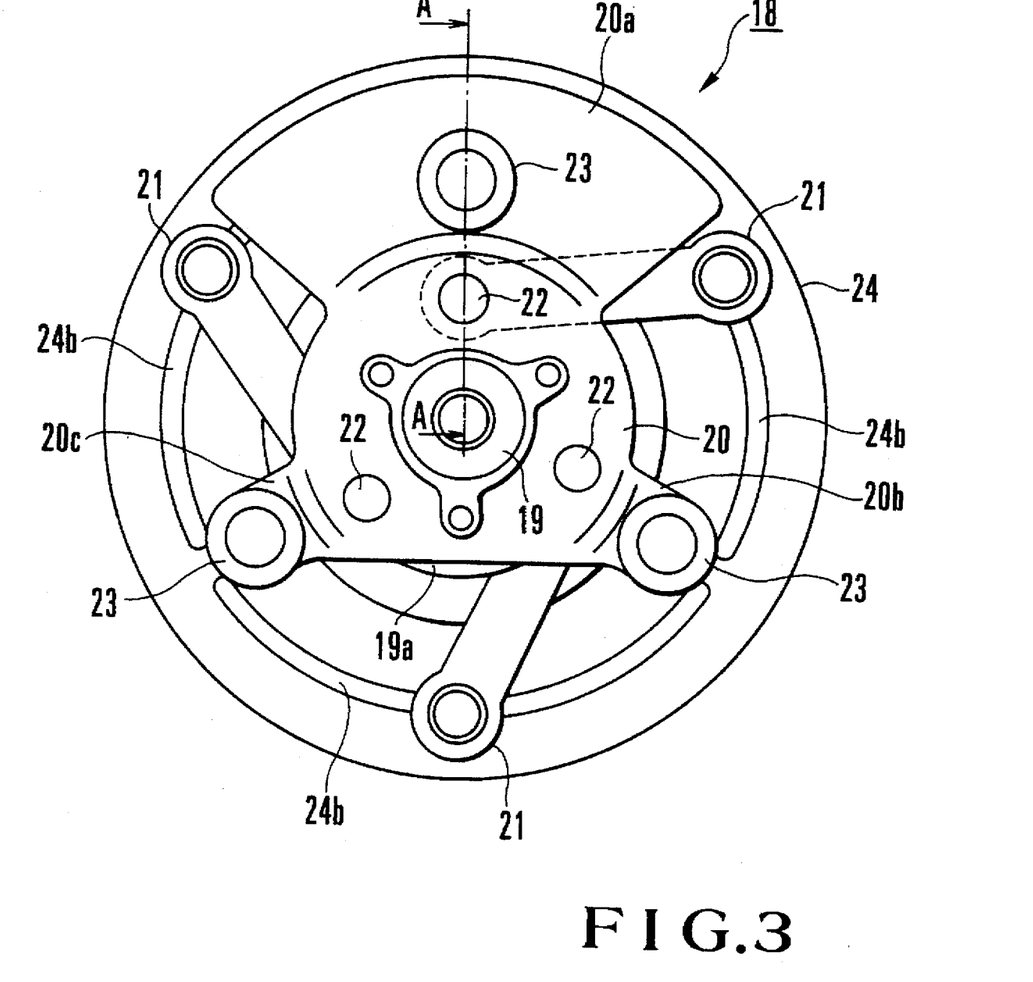
FIG. 3 is a front view of an armature assembly as an electromagnetic coupling apparatus according to the second embodiment of the present invention.

An electromagnetic coupling apparatus according to the second embodiment of the present invention will be described. FIG. 3 shows an armature assembly, and FIG. 4 shows the section taken along the line A—A of FIG. 3.

In an armature assembly 18 shown in FIGS. 3 and 4, the position of a balance weight portion 20a to be described later is adjusted such that its dynamic unbalance acts in a 180° opposite direction to the direction in which the dynamic unbalance of an oscillating compressor acts. Thereafter, an armature hub 19 is mounted on the rotating shaft of the oscillating compressor. Except for the armature assembly 18, the structure of the electromagnetic coupling apparatus is the same as that of the electromagnetic clutch 1, and a detailed description thereof is thus omitted.

Figure 4:
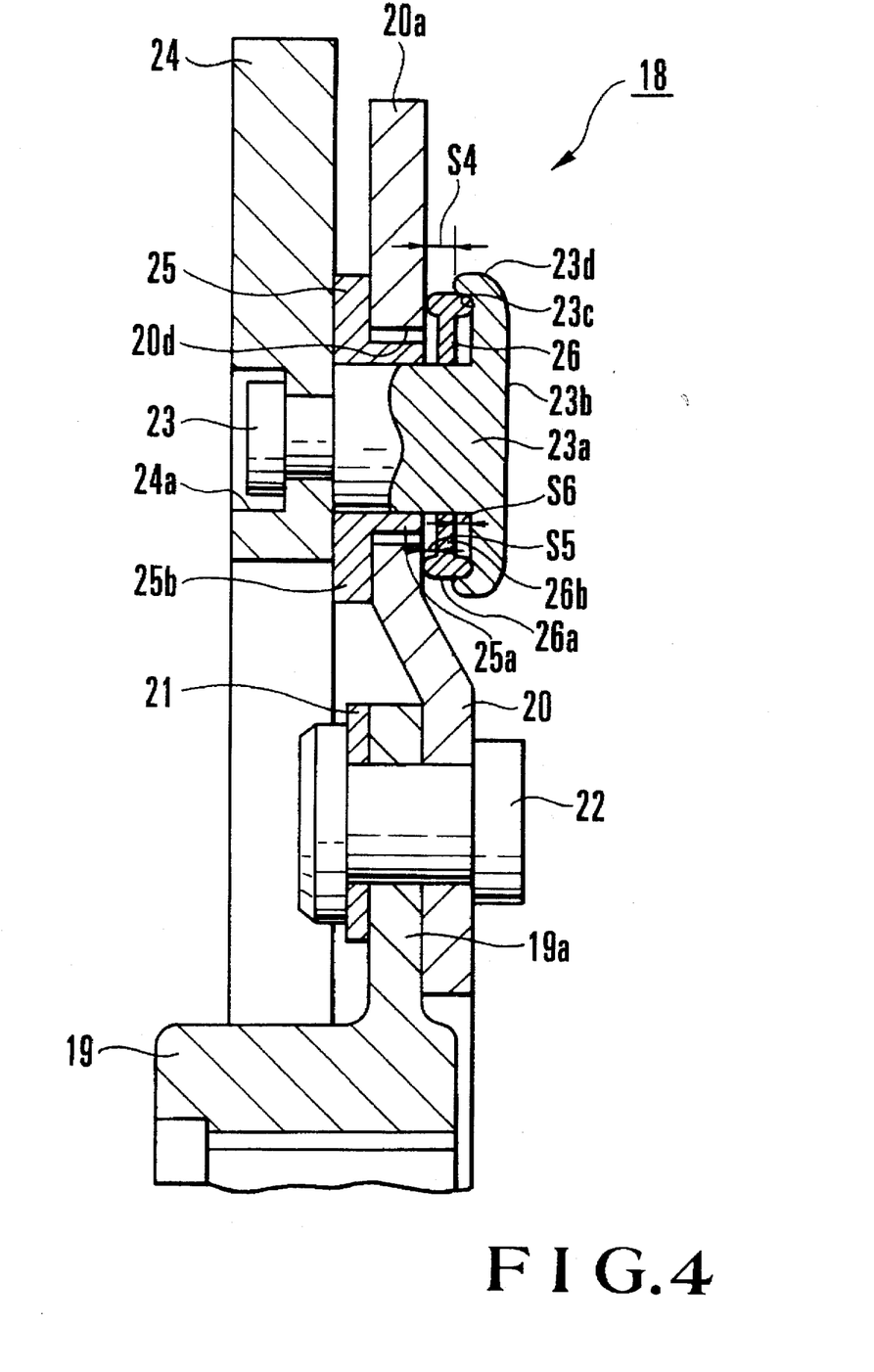
FIG. 4 is a sectional view of the armature assembly shown in FIG. 3 along the line A—A of FIG. 3.

Referring to FIG. 4, a stopper plate 20 is overlaid on one side surface of a flange portion 19a of the armature hub 19, and the proximal end portion of a leaf spring 21 is overlaid on the other side surface of the flange portion 19a of the armature hub 19. The flange portion 19a, the stopper plate 20, and the proximal end portion of the leaf spring 21 are integrally fixed by caulking a rivet 22. As shown in FIG. 3, flange portions 20a, 20b, and 20c extending in the radial direction are integrally formed on the stopper plate 20 at three equal angular positions of the stopper plate 20. The flange portions 20a, 20b, and 20c are formed by extrusion of press molding in the axial direction (a rotor 6 side in FIG. 1). One flange portion 20a is formed as a balance weight portion larger than other flange portions 20b and 20c, and it is fan-shaped when seen from the front.

Through holes 20d are respectively formed in the flange portions 20a, 20b, and 20c of the stopper plate 20. The distal ends of fixing members 23 are caulked in stepped through holes 24a formed in an armature 24 to which the free end portions of the leaf springs 21 are fixed. The fixing members 23 are made of a metal material, and their columnar trunk portions 23a extend through the corresponding through holes 20d. A cylindrical portion 25a of a rubber stopper 25 is fitted on the trunk portion 23a of each fixing member 23, and a disk portion 25b of the rubber stopper 25 is sandwiched between the armature 24 and each of the flange portions 20a, 20b, and 20c of the stopper plate 20. The disk portion 25b of the rubber stopper 25 limits the backward-moving amount of the armature 24. Note that reference symbols 24b in FIG. 3 denote arcuated slits provided to bypass the magnetic flux of the electromagnetic coil.

The peripheral portion of the head portion 23b of each fixing member 23 forms a spindle-shaped wall portion 23d bent by plastic molding using a pressing force such that its inner bent portion 23c is arcuated. The distal end of the wall portion 23d is arcuatedly chamfered. A second gap S4 formed between the distal end of the wall portion 23d and the stopper plate 20 is larger than the first gap G shown in FIGS. 1 and 2.

Rubber vibration insulators 26 are sandwiched between the head portions 23b of the fixing members 23 and the flange portions 20a, 20b, of 20c of the stopper plate 20. Each rubber vibration insulator 26 is of a shape similar to that of the rubber vibration insulator 17 shown in FIGS. 1 and 2, and has a cylindrical portion 26a and a disk portion 26b. The cylindrical portion 26a has two end portions forming arcuated surfaces similar to the arcuated surface of the bent portion 23c of the fixing member 23. The disk portion 26b is formed with a through hole into which the trunk portion 23a of the fixing member 23 is pressed and fitted.

The disk portion 26b of the rubber vibration insulator 26 is assembled such that it is not in contact with the side surface of the flange portions 20a, 20b, or 20c of the stopper plate 20 and the head portion 23b of the fixing member 23. A third gap S5 is formed between one side surface of the disk portion 26b and the side surface of the flange portion 20a, 20b, or 20c of the stopper plate 20, and a fourth gap S6 is formed between the other side surface of the disk portion 26b and the head portion 23b of the fixing member 23. Each of the third and fourth gaps S5 and S6 is equal to or slightly larger than the first gap G shown in FIG. 1 and 2.

More specifically, when the armature 24 is magnetically attracted to the rotor, the cylindrical portion 26a of each rubber vibration insulator 26 will not be sandwiched between the distal end of the wall portion 23d of the fixing member 23 and the side surface of the flange portion 20a, 20b, or 20c of the stopper plate 20 (second gap S4), and the disk portion 26b of each rubber vibration insulator 26 will not bite into the through hole 20d of the flange portion, 20a, 20b, or 20c of the stopper plate 20. Thus, an operation similar to that of the electromagnetic clutch 1 can be obtained.

The electromagnetic clutch incorporating the armature assembly 18 having the above structure transmits or disconnects transmission of rotation of the engine to the rotating shaft of the oscillating compressor. The unbalance of the oscillating compressor is canceled by the unbalance caused by the balance weight portion (the flange portion 20a of the stopper plate 20) of the armature assembly 18.

The above embodiments of the present invention exemplify electromagnetic clutches of automotive air-conditioning systems as electromagnetic coupling apparatuses. The present invention can also be applied to an electromagnetic coupling apparatus other than an electromagnetic clutch mounted to a compressor of an automotive air-conditioning system. There have been described a structure in which the stopper plate is integrally fixed to the flange portion of the armature hub through the proximal end portion of a leaf spring with a rivet, and a structure in which the flange portion of the armature hub is sandwiched between the proximal end portion of the leaf spring and the stopper plate and is integrally fixed to them with a rivet. The stopper plate is formed as an extension of the flange portion of the armature hub, and the design can be modified into a structure in which the stopper plate and the flange portion of the armature hub are integrally formed. More specifically, the flange portion of the armature hub includes a stopper plate which is integrally fixed to the flange portion of an armature hub with a rivet.

A structure in which the rubber stoppers are fitted on the trunk portions of the fixing members has been described. Another structure is possible in which other through holes are formed in the stopper plate and the flange portion of the armature hub, and the columnar portions of the rubber stoppers which are integrally formed with disk portions are pressed into and fitted in these through holes.

Furthermore, in order to form the third gap between the side surface of the disk portion of the rubber vibration insulator and the side surface of the flange portion of the armature hub (or the side surface of the stopper plate), the disk portion and the cylindrical portion of the rubber vibration insulator are formed to have an H-shaped section. In other words, the fourth gap is formed between the disk portion of the rubber vibration insulator and the head portion of the fixing member. However, the rubber vibration insulator may be formed to have a U-shaped section, and the fourth gap may not be provided.

The fixing member integrally formed with a wall portion has been described. However, a separate cup-shaped member may be provided and fixed to the head portion of the fixing member. The fixing member has been described as one made of a metal material. However, in the electromagnetic coupling apparatus of the present invention, the fixing member is not constituted as a power transmitting line that transmits rotation, and the rubber hardness of the rubber vibration insulator is very low when compared to the rubber hardness of the rubber stopper. Thus, the fixing member may be made of a non-metallic material, e.g., a synthetic resin material. In this case, the distal end of a fixing member made of a synthetic resin material may not be formed by plastic molding but may be thermally deformed in the stepped through hole of the armature in accordance with ultrasonic welding.

In this manner, in the electromagnetic coupling apparatus of the present invention, a wall portion to be fitted with the rubber vibration insulator is provided on the peripheral portion of the head portion of the fixing member. The second gap formed between the distal end of the wall portion and the flange portion of the armature hub is set larger than the first gap formed between the armature and the rotor. The rubber vibration insulator is constituted by a cylindrical portion which is sandwiched between the side surface of the flange portion of the armature hub and the head portion of the fixing member and which has an outer circumferential surface fitted on the wall portion of the fixing member, and a disk portion which is integrally formed with the cylindrical portion and which is fitted on the trunk portion of the fixing member. The third gap is formed between one side surface of the disk portion of the rubber vibration insulator and the side surface of the flange portion of the armature hub. Hence, falling off of the rubber vibration insulator can be simply prevented by only modifying the design of the fixing member. In addition, unlike a conventional structure in which a gap is formed between an armature whose backward movement is limited by a rubber stopper and a recessed portion accommodating the rubber vibration insulator, the size of the electromagnetic coupling apparatus in the axial direction can be decreased by a small amount.

When the armature is magnetically attracted to the rotor, the disk portion of the rubber vibration insulator does not bite into the ridge of the opening of the through hole formed in the flange portion of the armature hub. Also, the cylindrical portion of the elastically deformed rubber vibration insulator is not sandwiched between the distal end of the wall portion of the fixing member and the flange portion of the armature hub (in the second gap). Thus, occurrence of cracks due to deterioration over time is prevented, leading to a high durability of the rubber vibration insulator.

A wall portion which is bent by plastic molding and is brought into contact with the outer circumferential surface of the rubber vibration insulator is provided to the peripheral portion of the head portion of the fixing member, and the second gap formed between the distal end of the wall portion and the flange portion of the armature hub is set to be larger than the first gap formed between the armature and the rotor. Hence, prevention of falling off of the rubber vibration insulator can be easily achieved without increasing the size of the apparatus in the axial direction, which is very effective in the industrial field of this sort. In addition, a component to form a wall portion need not be particularly prepared, and a step of fixing such a component to the head portion is not needed, which is economical.

The rubber vibration insulator is interposed between the head portion of the fixing member and the flange portion of the armature hub, and the rubber stopper is interposed between the flange portion of the armature hub and the armature. In this state, the distal end of the fixing member is fixed to the armature. Thus, separate rubber vibration insulator and rubber stopper that are assembled in a non-contact manner can be elastically deformed separately, thereby improving the durability of the rubber vibration insulator and the rubber stopper.

The rubber vibration insulator is constituted by a cylindrical portion which is sandwiched between the side surface of the flange portion of the armature hub and the head portion of the fixing member and which has an outer circumferential surface fitted on the wall portion of the fixing member, and a disk portion which is integrally formed with the cylindrical portion and which is fitted on the trunk portion of the fixing member. The third gap is formed between one side surface of the disk portion of the rubber vibration insulator and the side surface of the flange portion of the armature hub, and the fourth gap is formed between the other side surface of the disk portion of the rubber vibration insulator and the side surface of the head portion of the fixing member. Hence, falling off of the rubber vibration insulator is prevented, and occurrence of cracks due to deterioration over time is prevented, leading to a high durability of the rubber vibration insulator. Since the cylindrical portion of the rubber vibration insulator is elastically deformed into the fourth gap as well, the compression stress of the rubber vibration insulator serving as a reaction force that occurs when magnetically attracting the armature to the rotor can be decreased.

A wall portion which is bent by plastic molding and is brought into contact with the outer circumferential surface of the rubber vibration insulator is provided to the peripheral portion of the head portion of the fixing member, and the second gap formed between the distal end of the wall portion and the flange portion of the stopper plate is set to be larger than the first gap formed between the armature and the rotor. Hence, prevention of falling off of the rubber vibration insulator can be easily achieved without increasing the size of the apparatus in the axial direction, which is very effective in the industrial field of this sort. In addition, a component to form a wall portion need not be particularly prepared, and a step of fixing such a component to the head portion is not needed, which is economical.

The rubber vibration insulator is interposed between the head portion of the fixing member and the flange portion of the stopper plate, and the rubber stopper is interposed between the flange portion of the stopper plate and the armature. In this state, the distal end of the fixing member is fixed to the armature. Thus, separate rubber vibration insulator and rubber stopper that are assembled in a non-contact manner can be elastically deformed separately, thereby improving the durability of the rubber vibration insulator and the rubber stopper.

The rubber vibration insulator is constituted by a cylindrical portion which is sandwiched between the side surface of the flange portion of the stopper plate and the head portion of the fixing member and which has an outer circumferential surface fitted on the wall portion of the fixing member, and a disk portion which is integrally formed with the cylindrical portion and which is fitted on the trunk portion of the fixing member. The third gap is formed between one side surface of the disk portion of the rubber vibration insulator and the side surface of the flange portion of the stopper plate, and the fourth gap is formed between the other side surface of the disk portion of the rubber vibration insulator and the side surface of the head portion of the fixing member. Hence, falling off of the rubber vibration insulator is prevented, and occurrence of cracks due to deterioration over time is prevented, leading to a high durability of the rubber vibration insulator. Since the cylindrical portion of the rubber vibration insulator is elastically deformed into the fourth gap as well, the compression stress of the rubber vibration insulator serving as a reaction force that occurs when magnetically attracting the armature to the rotor can be decreased.

At least one of the flange portions of the stopper plate is provided as the balance weight portion. Thus, the resultant structure can be used as an electromagnetic coupling apparatus that cancels the unbalance of the oscillating compressor of the automotive air conditioning system.

What is claimed is:

1. An electromagnetic coupling apparatus comprising:
   an armature hub fixed to a rotating shaft of a device, said armature hub having a flange unit formed with a through hole;
   a leaf spring having a proximal end portion fixed to said flange unit of said armature hub;
   an armature to which a free end portion of said leaf spring is fixed and which is biased in a decoupling direction;
   a rubber stopper disposed between said flange unit of said armature hub and said armature;
   a fixing member fixed to said armature, said fixing member having a trunk portion extending through the through hole formed in said flange unit of said armature hub and a head portion projecting from said flange unit of said armature hub to a side opposite said armature and formed with an annular projecting ridge portion on a peripheral portion thereof;
   a rubber vibration insulator disposed between a side surface of said flange unit of said armature hub and said head portion of said fixing member, said rubber vibration insulator being constituted by a cylindrical portion which is sandwiched between said side surface of said flange unit of said armature hub and said head portion of said fixing member and which has an outer circumferential surface fitted with said projecting ridge portion of said fixing member, and a disk portion formed in said cylindrical portion to be integral therewith and having a through hole to fit on said trunk portion of said fixing member;
   a rotor opposing said armature through a first gap of a predetermined size;
   an electromagnetic coil for generating a magnetic flux in order to cause said rotor to magnetically attract said armature against a biasing force of said leaf spring; and
   a field core fixed to said unit to accommodate said electromagnetic coil,
   wherein a second gap larger than the first gap is formed between a distal end of said projecting ridge portion of said fixing member and said flange unit of said armature hub, and a third gap is formed between one side surface of said disk portion of said rubber vibration insulator and said side surface of said flange unit of said armature hub.

2. An apparatus according to claim 1, wherein said projecting ridge portion of said fixing member that fits on said outer circumferential surface of said rubber vibration insulator is bent toward said armature by plastic molding.

3. An apparatus of claim 1, wherein said rubber stopper is constituted by a disk portion disposed between said armature and said flange unit of said armature hub, and a cylindrical portion integrally formed with said disk portion at a central portion of said disk portion and inserted in the through hole formed in said flange unit of said armature hub, said trunk portion of said fixing member extends through said cylindrical portion of said rubber stopper, and said rubber vibration insulator is fitted on said trunk portion of said fixing member not to contact said cylindrical portion of said rubber stopper.

4. An apparatus according to claim 1, wherein a fourth gap is formed between the other side surface of said disk portion of said rubber vibration insulator and a side surface of said head portion of said fixing member.

5. An apparatus according to claim 4, wherein the third and fourth gaps have a size not less than the first gap.

6. An electromagnetic coupling apparatus comprising:

an armature hub fixed to a rotating shaft of a device, said armature hub having a flange unit;

a leaf spring having a proximal end portion fixed to said flange unit of said armature hub;

a stopper plate coupled to said flange unit of said armature hub together with said leaf spring, said stopper plate having a plurality of flange portions each extending in a radial direction and formed with a through hole;

an armature to which a free end portion of said leaf spring is fixed and which is biased in a decoupling direction;

a rubber stopper disposed between said flange unit of said stopper plate and said armature;

a fixing member fixed to said armature, said fixing member having a trunk portion extending through a through hole formed in each of said flange portions of said stopper plate and a head portion projecting from each of said flange portions of said stopper plate to a side opposite said armature and formed with an annular projecting ridge portion on a peripheral portion thereof;

a rubber vibration insulator disposed between a side surface of said flange unit of said armature hub and said head portion of said fixing member, said rubber vibration insulator being constituted by a cylindrical portion which is sandwiched between said side surface of each of said flange portions of said stopper plate and said head portion of said fixing member and which has an outer circumferential surface fitted with said projecting ridge portion of said fixing member, and a disk portion formed in said cylindrical portion to be integral therewith and having a through hole to fit on said trunk portion of said fixing member;

a rotor opposing said armature through a first gap of a predetermined size;

an electromagnetic coil for generating a magnetic flux in order to cause said rotor to magnetically attract said armature against a biasing force of said leaf spring; and a field core fixed to said unit to accommodate said electromagnetic coil, wherein a second gap larger than the first gap is formed between a distal end of said projecting ridge portion of said fixing member and said flange portion of said stopper plate, and a third gap is formed between one side surface of said disk portion of said rubber vibration insulator and said side surface of each of said flange portions of said stopper plate.

7. An apparatus according to claim 6, wherein said projecting ridge portion of said fixing member that fits on said outer circumferential surface of said rubber vibration insulator is bent toward said armature by plastic molding.

8. An apparatus of claim 6, wherein said rubber stopper is constituted by a disk portion disposed between said armature and said flange unit of said armature hub, and a cylindrical portion integrally formed with said disk portion at a central portion of said disk portion and inserted in a through hole formed in said flange unit of said armature hub, said trunk portion of said fixing member extends through said cylindrical portion of said rubber stopper, and said rubber vibration insulator is fitted on said trunk portion of said fixing member not to contact said cylindrical portion of said rubber stopper.

9. An apparatus according to claim 6, wherein a fourth gap is formed between the other side surface of said disk portion of said rubber vibration insulator and a side surface of said head portion of said fixing member.

10. An apparatus according to claim 6, wherein the third and fourth gaps have a size not less than the first gap.

11. An apparatus according to claim 6, wherein at least one of said flange portions of said stopper plate is formed as a balance weight portion having a shape larger than other flange portions.

12. The apparatus of claim 1, wherein said flange unit includes a flange portion of said armature hub and a stopper plate coupled to said flange portion.

13. The apparatus of claim 12, wherein said stopper plate is integrally fixed to said flange portion.

14. The apparatus of claim 6, wherein said flange unit includes a flange portion of said armature hub.

15. The apparatus of claim 14, wherein said stopper plate is integrally fixed to said flange unit.

* * * * *